US012008926B2

(12) United States Patent
Shinkle, II et al.

(10) Patent No.: US 12,008,926 B2
(45) Date of Patent: *Jun. 11, 2024

(54) TAMPER-EVIDENT LABEL (71) Applicant: Iconex LLC, Duluth, GA (US)

(72) Inventors: Robert L. Shinkle, II, Peachtree Corners, GA (US); Karolyn Greason, Duluth, GA (US)

(73) Assignee: Iconex LLC, Duluth, GA (US)

(*) Notice: Subject to any disclaimer, the term of this patent is extended or adjusted under 35 U.S.C. 154(b) by 283 days.

This patent is subject to a terminal disclaimer.

(21) Appl. No.: 17/374,768

(22) Filed: Jul. 13, 2021

(65) Prior Publication Data
US 2022/0005380 A1    Jan. 6, 2022

Related U.S. Application Data (63) Continuation of application No. 16/166,032, filed on Oct. 19, 2018, now Pat. No. 11,158,213.

(51) Int. Cl.
*G09F 3/00* (2006.01)
*B32B 7/06* (2019.01)
(Continued)

(52) U.S. Cl.
CPC ............ *G09F 3/0292* (2013.01); *B32B 7/06* (2013.01); *B32B 7/12* (2013.01); *B32B 2519/00* (2013.01);
(Continued)

(58) Field of Classification Search
CPC ........ G03F 3/0292; G03F 3/03; G03F 3/0376; G03F 2003/0211; G03F 2003/0213;
(Continued)

(56) References Cited

U.S. PATENT DOCUMENTS

| 175,242 A | 3/1876 | Fletcher |
| 3,935,960 A * | 2/1976 | Cornell ................. G09F 3/0292 206/460 |

(Continued)

FOREIGN PATENT DOCUMENTS

| CA | 2134521 A1 | 5/1995 |
| GB | 2179910 A | 3/1987 |

(Continued)

OTHER PUBLICATIONS

"U.S. Appl. No. 16/166,032, Non Final Office Action dated Mar. 2, 2021", 12 pgs.

(Continued)

*Primary Examiner* — Gerard Higgins
(74) *Attorney, Agent, or Firm* — Schwegman Lundberg & Woessner, P.A.

(57) ABSTRACT

A label is provided with a warning layer coating integrated or applied to a front side of the label. The warning layer coating is not activated by application of heat; rather, the warning layer coating activates upon a directional force (vertical or horizontal puffing) applied to the label after the label was initially adhered to a container, bag, box, and/or object. Upon activation, visible color or a printed warning indicia is visible on a front surface of the label, providing evidence that the label was removed after initial application or providing evidence that the label was attempted to be removed after initial application.

6 Claims, 7 Drawing Sheets (51) Int. Cl.
 *B32B 7/12* (2006.01)
 *G09F 3/02* (2006.01)
(52) U.S. Cl.
 CPC ............... *G09F 2003/0211* (2013.01); *G09F 2003/0213* (2013.01); *G09F 2003/0229* (2013.01); *G09F 2003/028* (2013.01); *G09F 2003/0283* (2013.01)
(58) Field of Classification Search
 CPC ....... G03F 2003/0229; G03F 2003/028; G03F 2003/0283; B65D 55/026; B32B 7/06; B32B 7/12
 See application file for complete search history.

(56) References Cited

U.S. PATENT DOCUMENTS

| | | |
|---|---|---|
| 5,524,934 A | 6/1996 | Schwan et al. |
| 5,660,925 A | 8/1997 | Cooley et al. |
| 5,810,397 A | 9/1998 | Mehta et al. |
| 5,884,425 A | 3/1999 | Baldwin |
| 5,970,875 A | 10/1999 | Hoffmann et al. |
| 6,413,604 B1 | 7/2002 | Matthews et al. |
| 6,447,015 B1 | 9/2002 | Linnewiel |
| 7,878,410 B2 | 2/2011 | Norrby et al. |
| 8,312,655 B2 | 11/2012 | Liu et al. |
| 11,158,213 B2 | 10/2021 | Shinkle, II et al. |
| 11,881,125 B2 | 1/2024 | Lamb et al. |
| 2005/0230961 A1 | 10/2005 | Walley |
| 2007/0275133 A1 | 11/2007 | Sierra-gomez et al. |
| 2009/0015649 A1 | 1/2009 | Keeton et al. |
| 2009/0145540 A1 | 6/2009 | Francoeur |
| 2010/0132606 A1 | 6/2010 | Hagmaier |
| 2010/0233412 A1 | 9/2010 | Wong et al. |
| 2010/0237605 A1 | 9/2010 | Vidler et al. |
| 2011/0126439 A1 | 6/2011 | Liu et al. |
| 2012/0128835 A1 | 5/2012 | Lyzenga et al. |
| 2012/0249624 A1 | 10/2012 | Roth et al. |
| 2012/0280483 A1 | 11/2012 | Jeske et al. |
| 2015/0161915 A1 | 6/2015 | Wild |
| 2017/0236453 A1 | 8/2017 | Berbert et al. |
| 2017/0352299 A1 | 12/2017 | Amron |
| 2019/0228682 A1 | 7/2019 | Francoeur et al. |
| 2020/0126452 A1 | 4/2020 | Shinkle et al. |
| 2020/0365061 A1 | 11/2020 | Shinkle, II et al. |
| 2021/0251628 A1 | 8/2021 | Leung et al. |
| 2022/0246066 A1 | 8/2022 | Lamb et al. |

FOREIGN PATENT DOCUMENTS

| | | |
|---|---|---|
| JP | 2003291989 | 10/2003 |
| KR | 20120116635 A | 10/2012 |
| KR | 20190040389 | 4/2019 |
| SE | 528869 C2 | 3/2007 |
| WO | WO-91/19231 A1 | 12/1991 |
| WO | 0062272 | 10/2000 |
| WO | WO-2015017494 A1 | 2/2015 |
| WO | WO-2020/081845 A1 | 4/2020 |
| WO | WO-2022/031799 A1 | 2/2022 |

OTHER PUBLICATIONS

"U.S. Appl. No. 16/166,032, Notice of Allowance dated Jun. 25, 2021", 8 pgs.
"U.S. Appl. No. 16/166,032, Response filed Jun. 2, 2021 to Non Final Office Action dated Mar. 2, 2021", 11 pgs.
"U.S. Appl. No. 16/166,032, Response filed Dec. 30, 2020 to Restriction Requirement dated Dec. 3, 2020", 6 pgs.
"U.S. Appl. No. 16/166,032, Restriction Requirement dated Dec. 3, 2020", 7 pgs.
"U.S. Appl. No. 17/163,035, Restriction Requirement dated Mar. 17, 2022", 7 pgs.
"European Application Serial No. 19872352.0, Extended European Search Report dated Mar. 21, 2022", 13 pgs.
"International Application Serial No. PCT/US2019/056782, International Preliminary Report on Patentability dated Apr. 29, 2021", 8 pgs.
"International Application Serial No. PCT/US2019/056782, International Search Report dated Jan. 2, 2020", 2 pgs.
"International Application Serial No. PCT/US2019/056782, Written Opinion dated Jan. 2, 2020", 6 pgs.
"International Application Serial No. PCT/US2021/044472, International Search Report dated Nov. 17, 2021", 2 pgs.
"International Application Serial No. PCT/US2021/044472, Written Opinion dated Nov. 17, 2021", 7 pgs.
"International Application Serial No. PCT/US2022/014323, International Search Report dated Apr. 14, 2022", 2 pgs.
"International Application Serial No. PCT/US2022/014323, Written Opinion dated Apr. 14, 2022", 7 pgs.
U.S. Appl. No. 18/513,910, filed Nov. 20, 2023, Labels with Liner Separation Feature.

* cited by examiner

TAMPER-EVIDENT LABEL

RELATED APPLICATIONS

The presenting application is a continuation of, is co-pending with, and claims priority to U.S. application Ser. No. 16/166,032 filed on Oct. 19, 2018 entitled "Tamper-Evident Label;" the disclosure of which is incorporated by reference in its entirety herein and below.

BACKGROUND

As the market for third-party food delivery services continues to grow, retailers and restaurant owners are searching for solutions that ensure freshness and safety of their products until those products reach their customers.

Containers of prepared or stock food items provide little to no evidence to the retailers, restaurant owners, third-party delivery services, and the consumer that would indicate if the containers have been opened or disturbed at the time that the order is either picked up by a third-party service and/or delivered to the end consumer. Typically, labels on the container include contents of the container, caloric information, where required, and sell-by or use-by dates, as applicable. However, there is no way to ensure that that the label was not removed and re-placed on the container during the preparation and delivery. Accordingly, there is no practical and efficient mechanism by which the retailers and restaurant owners can assure that the containers of food have not been tampered with after packaging and prior to delivery or consumption by consumers.

Therefore, what is needed is a tamper-evident label that provides demonstrative evidence when a food container has been opened prior to consumption or purchase by a consumer.

SUMMARY

In various embodiments, labels and label rolls are provided having tamper-evident features.

Specifically, and in an embodiment, a label is provided. The label including: a substrate, a front side of the substrate, and a back side of the substrate. The front side has a thermal-sensitive coating and a warning layer coating. The back side includes an adhesive coating. The warning layer coating is adapted to activate and provide a visible color or visible printed indicia on the front side when a directional force is applied to the label.

DETAILED DESCRIPTION

As will be described more completely herein and below, a tamper-evident label is presented with a microencapsulated ink or a file-based warning layer applied as a tamper-evident layer over a print layer of a substrate. The microencapsulated ink or film is dispersed and activated to stain, or provided a worded warning (indicia) and color the label when a directional force is applied to the label, such as a directional force associated with removing the label after the label has been previously adhered or affixed to an object. The labels may be manufactured in a roll of individually separable labels.

Furthermore, the labels may be adhered to or affixed to containers, boxes, bags, etc. with the warning layer as a mechanism to visually detect and discern when the containers, boxes, bags, etc. have been opened or otherwise tampered with.

Figure 1A:
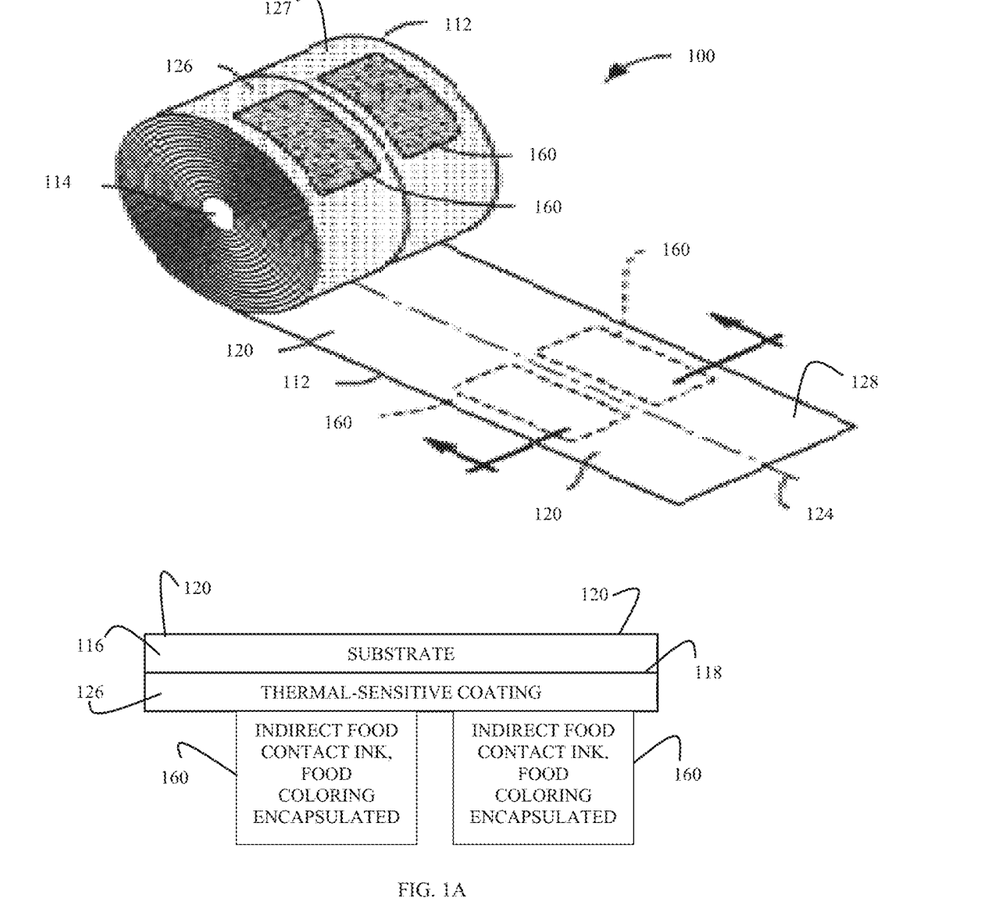
FIG. 1A is a diagram of roll of tamper-evident labels having tamper-evident features, according to an example embodiment.
Figure 1B:
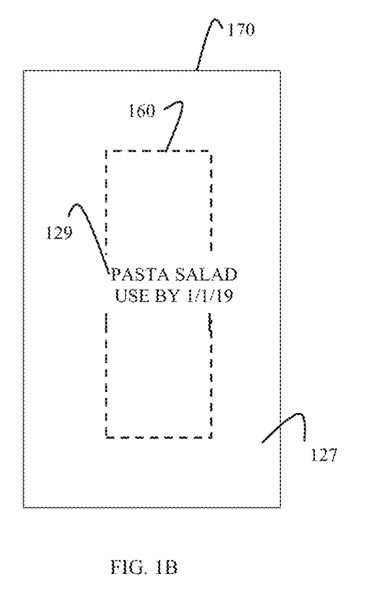
FIG. 1B is a diagram of a front side of a tamper-evident label, according to an example embodiment.
Figure 1C:
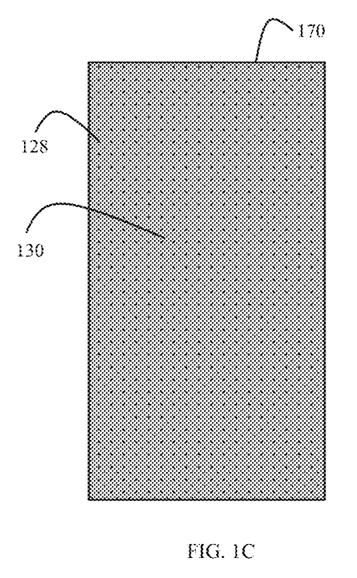
FIG. 1C is a diagram of a backside of a tamper-evident label, according to an example embodiment.

FIG. 1A is a diagram of roll 100/112 of labels 170 (shown in the FIGS. 1B and 1C). Each label 170 includes a warning layer 160 (shown in the FIG. 1A as microencapsulated ink patch 160 but could be an invisible ink associated with a written warning indicia that when activated visual reveals the written warning indicia, as shown in the FIG. 1E). The roll 100/112 comprises a substrate 116/120; the labels 170 are individually separable from the roll 100 during application when the roll 100/112 is loaded into a printer for purposes of producing imaged labels 170 (see FIGS. 1B-1E). During manufacture of the roll 100/112, the individually manufactured labels 170 represented on the substrate 116/120 are wound into the roll 100/112, such that a center of roll 100/112 includes a hollow core 114. The core 114 adapted in size and dimensions to fit into a media holder of a printer when the roll 100/112 is loaded into the printer for application.

The substrate 116/120 includes a front side 127 and a back or rear side 128. A surface 118 of the front side 127 is coated with thermal ink (thermal-sensitive coating) 126 that enables each label 170 (during application) to be custom imaged with indicia (e.g., indicia 129 of the FIG. 1C) when a thermal print head applies heat within a thermal printer to the surface 118 having the thermal-sensitive coating 126.

As illustrated in the FIG. 1C, the backside 128 of the substrate 116/120 is coated with an adhesive 130.

Furthermore, although not illustrated in the FIGS., the roll 100/112 may include a second substrate, such as a liner that permits each label 170 to be removed from the liner exposing the adhesive 130 of the backside 128.

Thus, the labels 170 can be linerless labels and/or liner-based labels 170.

In an embodiment, the thermal-sensitive coating 126 is applied to the front surface and on top of the thermal-sensitive coating 126 the warning layer 160 is applied and on top of the thermal-sensitive coating 126 and the warning layer 160, a release coating is applied. The release coating permitting the front side 127 from adhering to the backside 128 when the labels 170 are unwound from the roll 100/112. The release coating can be silicon-based or water-based.

Each label 170 may comprise pairs of the warning layer coatings 160 (shown in the FIG. 1A as a pair of microencapsulated patches 160 and as a pair of longitudinal patches 160 (each pair comprising a warning layer coating, such that each label 170 comprises one or more additional warning layer coatings) and as a pair of longitudinal patches 160 in the FIG. 1C) or alternatively (as illustrated in the FIGS. 1B, 1D, and 1E), each label 170 may include a single warning layer coating 160, each label 170 may include three or more warning layers 160 activated indicia (not shown in the FIGS).

Furthermore, the warning layer 160 may be arranged in any location on top of the thermal-sensitive coating 126 (such as along one edge of the label 170, substantially in the center of the label 170, along two or more edges of the label 170, along top side or bottom side portions of the label 170).

In an embodiment, the warning layer 160 is comprised of two or more microencapsulated capsules of edible materials each of which exhibit no color or a while color individually, and each of which are integrated into the thermal-sensitive coating 126 or applied over the thermal-sensitive coating 126. The shell membranes of the capsules are not activated upon heat but are activated, causing their encapsulated shell membranes to burst or the layer to expose a warning message (warning indicia), upon tension (vertical or horizontal force). When the shell membranes are ruptured (activated), the edible materials combine with one another to exhibit a color (any non-white color) on the front surface 118 of the front side 127 of the label 170. This provides a visible discernable cue that the label 170 was tampered with after it was initially applied and affixed to the container. The label 170 can be initially applied over an opening of the container (again the container can be a bag or a box as well). As such, when the label 170 is removed after having initially been affixed over the opening of the container, the membranes of the warning layer 160 rupture, mix together, and exhibit the non-white color. This allows for quick visible discernment that the container has been or was potentially opened and tampered with. Because the shell of the capsules for the two clear materials do not activate upon application of heat and exhibit a clear or white color individually, the thermal-sensitive coating 126 can be imaged under the capsules with no visible indication of the capsules being noticeable following the imaged indicia 129 on the front side 127 of the label 170

In an embodiment, warning layer 160 can be formulated as a membrane shell have characteristics that are: heat resistant and exhibit a white color. The membrane shell encases an edible-based ink, such as food coloring (having a non-white color). The membrane shell having the encapsulated edible-ink (of any desired color other than the color of the substrate 100/112) and provided as a strip that is applied to or integrated within the thermal-sensitive coating 126. The membrane shell further having a relatively weak structure, such that when a directional force is applied to the label 170 in the vertical or horizontal direction with resistance (after the label 170 has already been affixed or adhered to an object (container, box, bag, etc.), the membrane ruptures releasing the encapsulated edible-ink onto the front surface 118 of the front side 127 of the label 170. This provides a visible discernable cue that the label 170 was tampered with after it was initially applied and affixed to the container. The label 170 can be initially applied over an opening of the container (again can be bag or box as well). As such, when the label 170 is removed after having initially been affixed over the opening of the container, the membrane shell ruptures releasing the ink. This allows for quick visible discernment that the container has been or was potentially opened and tampered with. Again, the membrane does not rupture upon thermal imaging such that locations on the substrate 112/120 that were imaged from the thermal-sensitive coating 126 under the membrane are visible.

In an embodiment, the warning layer 160 comprises the aforementioned membrane shell that encapsulates nanoparticles of food coloring or an edible and non-toxic coloring substance. The membrane exhibits heat-resistance such that does not rupture upon application of heat (such as when a thermal printer images the thermal-sensitive coating 126); however, the membrane does rupture on tension or force, such that when the label 170 is stretched or removed in the vertical or horizontal direction the nanoparticles are activated and an edible coloring substance (food safe liquid) is visible on the front surface 127 of the label 170 of the front surface of the label exposes a written warning indicia. The thermal-sensitive coating 126 can still be activated under the microencapsulated ink patch 160 through application of heat by a thermal print head of a thermal printer but without activating the nanoparticles of the microencapsulated ink patch 160.

In an embodiment, the thermal-sensitive coating 126 is applied over the warning layer 160, such that the label 170 is imaged overtop of the warning layer 160 and the microencapsulated capsules and/or membrane shell/film holding the edible ink is only visible when the capsules and/or membrane shell/film is ruptured. The capsules and/or membrane shell/film is not ruptured upon application of heat but are ruptured upon a directional force (horizontal or vertical force).

In an embodiment, the warning layer 160 includes food-safe color materials (food safe liquids) within beads that burst releasing the colors (with color, clear color, or invisible) associated with color materials when a direction force (vertical or horizontal pulling) is applied to the label 170.

In an embodiment, the warning layer 160 is comprised of one or two different edible food coloring materials (food safe liquids).

In an embodiment, the warning layer 160 is comprised of one or two different microencapsulated beads of edible food coloring materials.

In an embodiment, the warning layer 160 is comprised of heat tolerant and tension intolerant materials, such that the underlying edible food coloring materials mix and/or become visible upon tension but not upon application of heat.

The microencapsulated ink patch 160 does not exhibit any visible characteristics when applied to the front surface 118 and/or the thermal-sensitive coating 126 and does not exhibit any visible characteristics when the thermal-sensitive coating 126 is imaged on the label 170. However, when a directional force (tension from pulling in a vertical or horizontal direction) is applied to the label 170, the edible food coloring material of the warning layer 160 becomes visible on the front surface 118 of the label 170.

The FIG. 1B is a diagram of a front side 127 of a tamper-evident label 170, according to an example embodiment. The FIG. 1B is presented to illustrate that the thermal-sensitive coating 126 can be imaged with indicia 129 by a thermal printer without activating any visible characteristics of the food edible coloring material comprised within the warning layer 160.

The FIG. 1C is a diagram of a backside 128 of a tamper-evident label, according to an example embodiment. The FIG. 1C represented a backside 128 of the label 170 presented in the FIG. 1B. The backside 128 includes an adhesive coating 130. In an embodiment, the adhesive coating 130 can be uniformly coating on the backside 128 and/or applied in patches on the backside 128, such that some areas of the backside 128 are devoid of any adhesive (adhesive patches not shown in the FIG. 1C).

Figure 1D:
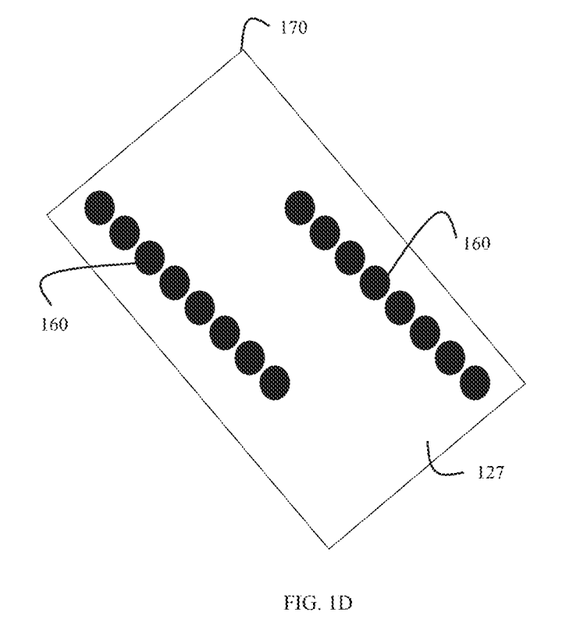
FIG. 1D is a diagram of a tamper-evident label, according to an example embodiment.

The FIG. 1D is a diagram that depicts two longitudinal micro encapsulated materials applied as the warning layer coating 160 that when activated reveal a colored (non-white) pattern of two diagonal lines of circles. It is noted that the geometrical shape can be achieved through strategically arranged microencapsulated beads that when activated from a horizontal or vertical pulling force on the label 170 reveal or make visible on the front side 127 of the label 170 a desired visual pattern.

Figure 1E:
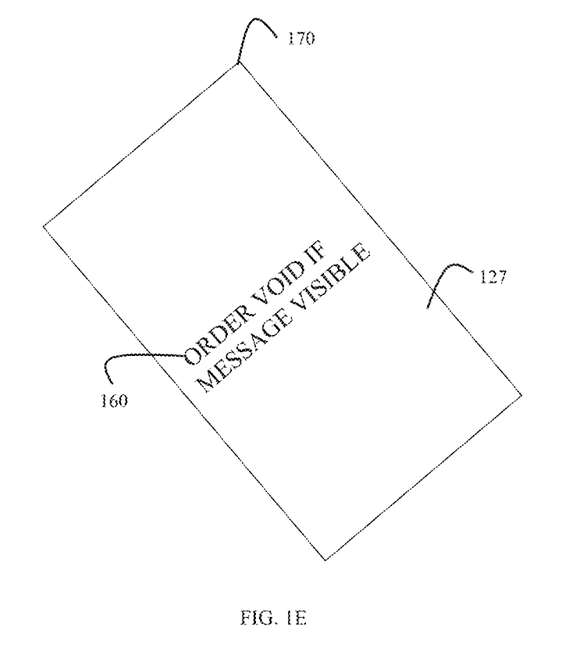
FIG. 1E is a diagram of a tamper-evident label, according to an example embodiment.

The FIG. 1E depicts a diagram of a printed warning indicia ("Order void if message is visible") on the front side 127 of the label 170. Here, the warning layer coating 160 is an invisible written/printed warning message that becomes visible and is revealed when the warning layer coating 160 is activated through a pulling force applied to the label 170 (such as when the label 170 is removed from a container upon which it is affixed or stretched).

In an embodiment, the warning layer 160 is sprayed onto the front surface 118 and/or onto the thermal-sensitive coating 126.

In an embodiment, the warning layer 160 is coated or rolled onto the front surface 118 and/or onto the thermal-sensitive coating 126.

In an embodiment, the warning layer 160 includes a small amount of adhesive on a backside of the warning layer 160 and is rolled onto the front surface 118 and/or the thermal-sensitive coating 126.

In an embodiment, the warning layer 160 includes a small amount of adhesive or a binding agent that adheres the backside of the warning layer 160 to the front side of the thermal-sensitive coating 126.

One now appreciates how a tamper-evident label 170 can provide visible evidence upon a directional force that the label 170 has been removed or attempted to be removed from a container, box, and/or bag after the label 170 was initially applied to the container, box, and/or bag. As such a restaurant owner receiving food items or a consumer purchasing food items can identify when a food item has been tampered with and can reject or return such food item.

In an embodiment, the label 170 can be used as a security indication for letters and/or other objects, such as a drawer, etc.

These and other embodiments are now discussed with reference to the FIGS. 2-4.

Figure 2:
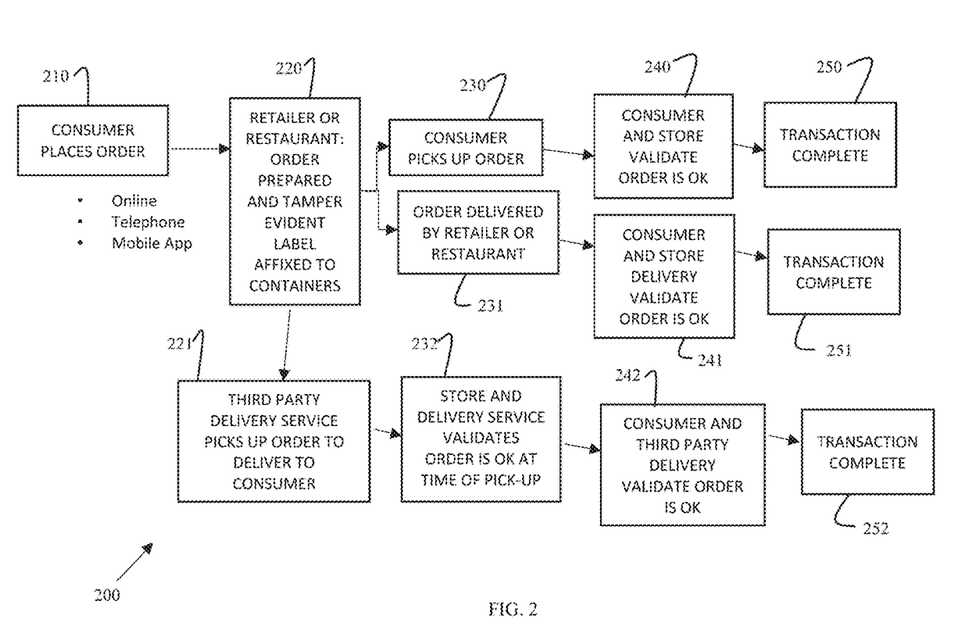
FIG. 2 is a diagram of a method of using a tamper-evident label, according to an example embodiment.

FIG. 2 is a diagram of a method 200 of using the tamper-evident label 170.

At 210, a consumer places an order for a food item. This can be done online (over a network connection), through voice via a phone, and/or via a mobile application that executes on a consumer's mobile device (phone, tablet, laptop, wearable processing device, etc.).

At 220, the retailer or restaurant receives the order and the food item is prepared after which the tamper-evident label 170 is affixed over an opening of the food item containers, such that the label is broken or needs to be removed for the consumer to open each of the containers.

Two options are available after the food items have been prepared and the tamper-evident labels 170 affixed to the food item containers.

In option 1, at 230, the consumer picks up the order with the containers or, at 231, the containers having the food item is delivered directly by the retailer or the restaurant that prepared the food item.

If the consumer picked up the order, at 240, the consumer can visible inspect the tamper-evident labels 170 to readily determine whether the containers were opened or not. If the tamper-evident labels 170 include the visible color pattern or a visible printed warning indicia, then the consumer can readily return the food items for a new order or a refund and the transaction is completed at 250.

If the retailer or restaurant delivered the order to the consumer, at 241, both the consumer (upon delivery and the delivery person) can validate the order is acceptable by ensure that the visible color pattern or the visible printed indicia is not present on the tamper-evident labels 170 at the time that the delivery person and the consumer both take possession of the order. Assuming, the labels 170 reveal no color or message, at 251, the transaction is completed.

In option 2, at 221, the third-party delivery service delivers the order to the consumer on behalf of the retailer or restaurant. At 232, both the store and delivery service personnel can validate that the order is okay by inspecting the label 170 for any visible color or printed message (visible indicia). Similarly, at 242, both the consumer and the third-party delivery service can inspect the label upon delivery to the consumer to determine if there is any color or message on the labels 170; assuming none is present, the transaction completes at 252.

The method of using the tamper-evident label 170 was presented as one use case. It is readily apparent that a variety of other use cases can be processed to validate items delivered, such as and by way of one additional example only, documents or boxes being mailed or delivered through package delivery services of the postal service.

Figure 3:
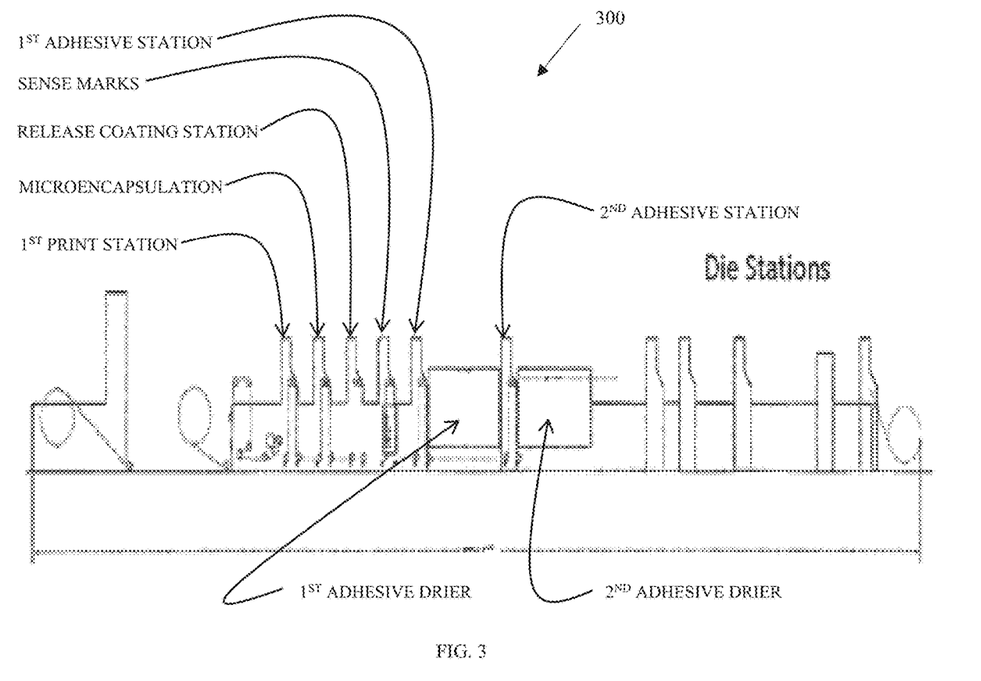
FIG. 3 is a diagram of a printing press that applies tamper-evident features to labels in a roll during manufacture of the roll, according to an example embodiment.

FIG. 3 is a diagram of a printing press 300 that applies one or more warning layers 160 to a roll 100/112 for each label 170 of the roll 100/112, according to an example embodiment.

An example press 300 is illustrated. The example press is a modified flexographic or "flexo" printing press. Modification is necessary to apply the warning layer 160 on top of a front side 127 or thermal-sensitive coating 126 of the labels 170 on the roll 100/112. One or more stations presented in the example press 300 may not be required for manufacture of the roll 100/112 and use of such stations is dependent on the type of label 170 being manufactured. For example, the substrate 116/120 of the roll 100/112 may include a liner and release coatings, etc.

The first print station applies the thermal-sensitive coating 126 to the front side 127 of the substrate 116/120, the microencapsulated station applies the warning layer 160 on top of thermal-sensitive coating 126, optionally a release coating station applies a release coating on top of the warning layer 160. One or more adhesive stations and or driers are processed to apply adhesive 130 to the backside 128 of the substrate 116/120 of the roll 100/112. Optionally, one or more die stations may be processed against the substrate 116/120 of the roll 100/112.

The microencapsulated station can spray, print, and/or roll the warning layer 160 on top of the thermal-sensitive coating 126.

Any configured coat weight for the thermal-sensitive coating 126, the warning layer 160, any release coating, and/or adhesive 130 can be used depending upon the design of the label 170.

It is to again be noted that the printing press 300 may include additional stations arranged in different orders. Furthermore, the release coating and curing station may include a silicone-based release coating or an aqueous non-silicone release coating. Additionally, although the release coating and curing station is shown as a single station, this may actually be two stations with a UV curing station following any silicone release coating station and with a dryer station following any aqueous non-silicone release coating station.

In an embodiment, the press 300 is configured for to coat and print onto the roll 100/112: an adhesive primer, adhesive, sense marks, lane marks, any registration marks and slitting guide marks on a non-thermal coated side (backside 128) of the roll 100/112 in a single pass on the roll 100/112 with the adhesive coating being last.

Figure 4:
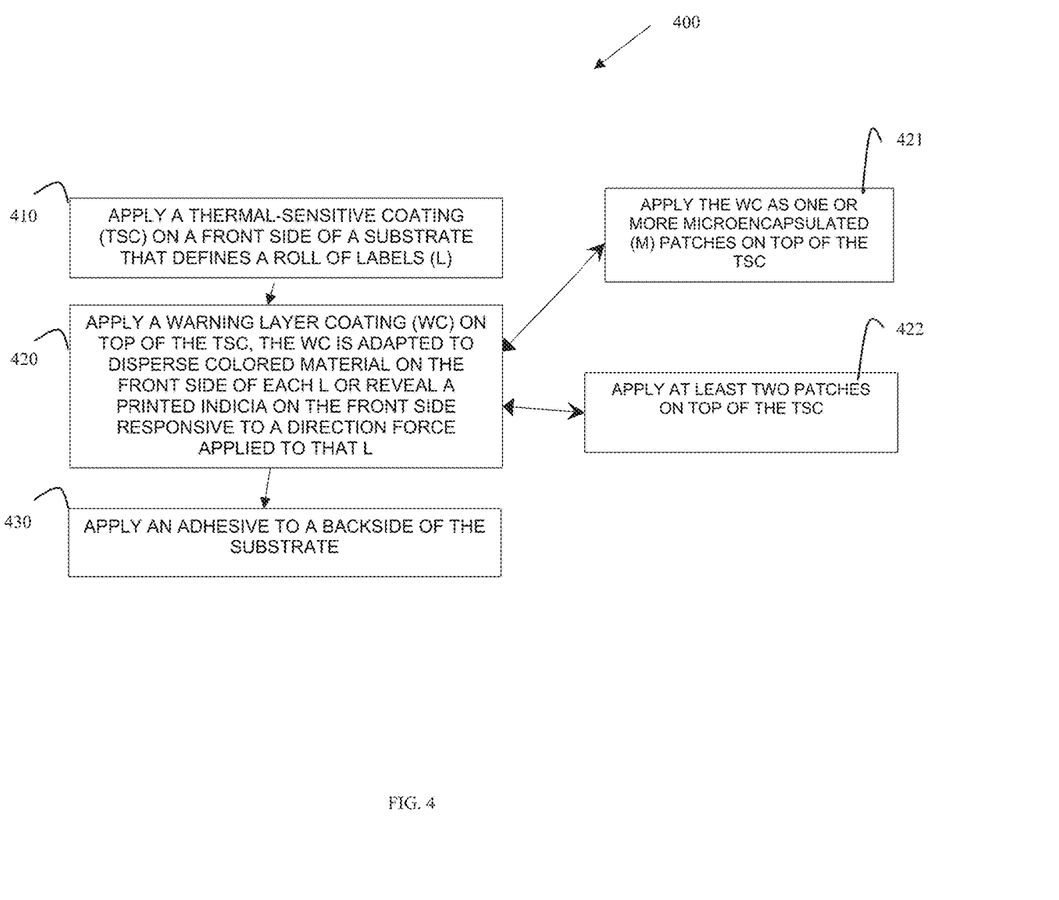
FIG. 4 is a diagram of a method of manufacturing a tamper-evident label, according to an example embodiment.

FIG. 4 is a diagram of a method 400 of manufacturing a tamper-evident label 100 having the warning layer 160, according to an example embodiment.

The method 400 is performed by press 300 of the FIG. 3. That is, non-transitory computer-readable storage media is programmed with instructions for performing the method 400. The instructions are executed by a processor. The processor may be embedded in the press 300 or may be interfaced through a control board to the electro-mechanical components of the press 300, such that the processor can activate and deactivate the componentry of the press 300 to manufacture rolls 100/112 of the labels 170.

At 410, the press applies a thermal-sensitive coating 126 on a front side 127 of a substrate 116/120.

At 420, the press applies a warning layer coating on top of the thermal-sensitive coating 126. The warning layer coating is adapted to disperse an edible colored material on the front side 127 of each label 170 or reveal a printed indicia on the front side 127 responsive to a directional force (vertical or horizontal pulling) applied to that label 170.

In an embodiment, at 421, the press applies the applies the warning layer coating as one or more microencapsulated patches on top of the thermal-sensitive coating 126

In an embodiment, at 422, the press applies at least two patches on top of the thermal-sensitive coating 126 (as illustrated in the FIG. 1A on the roll 100/112).

At 430, the press applies an adhesive to the backside of the substrate. The adhesive can be applied uniformly to the backside or can be applied as adhesive patches to the backside. The adhesive may be printed, rolled, or sprayed onto the backside.

In an embodiment, the warning layer coating includes one or more microencapsulated beads that include edible food-safe coloring material (food safe liquid) within each bead. The beads are not busted through application of heat. That is, the beads remain intact when heat is applied to the front surface 118 of the label 170 as the thermal-sensitive coating 126 is imaged by a thermal print head. The beads burst when a directional force (vertical or horizontal pulling) is placed on the label 170.

One now appreciates how a tamper-evident label 170 and rolls of the labels 170 are manufactured and provided for purposes of providing visible evidence on the front surface 118 of the label 170 when an attempt is made to remove the label 170 from a container, box, and/or bag after that label was initially placed on that container, box, and/or bag. As such, labels 170 can be placed over a portion of a lid or opening of an object when initially manufactured/prepared and any subsequent attempt to reopen the lid or opening is immediately detectable by the visible color dispersed or printed indicia revealed by the warning layer coating on the front surface 118 of the label 170. Furthermore, the warning layer coating is not activated by heat, such that the substrate 116/120 can be imaged without causing any color changes on the label 170 associated with disbursement of the microencapsulated material or revealing printed indicia.

Although the present invention has been described with particular reference to certain preferred embodiments thereof, variations and modifications of the present invention can be effected within the spirit and scope of the following claims.

The invention claimed is:

1. A label roll, comprising:
   a substrate;
   a plurality of labels defined within portions of the substrate; and
   each label comprises:
   a thermally-sensitive coating disposed on a frontside of the substrate;
   a warning layer coating disposed on the frontside of the substrate; and
   an adhesive coating disposed on a backside of the substrate;
   wherein the warning layer coating comprises heat-resistant capsules, each heat-resistant capsule comprises a food safe liquid within a shell membrane;
   wherein the food safe liquid within the corresponding shell membrane of each heat-resistant capsule exhibits no color;
   wherein the food safe liquid exhibits a non-white color on the frontside of the substrate when the corresponding shell membranes of the heat-resistant capsules are ruptured by a directional force applied to each label and the food safe liquid combine together on the frontside of the substrate.

2. The label roll of claim 1 further comprising a liner affixed to the backside of each of the plurality of labels via the adhesive coating of each label.

3. The label roll of claim 1, wherein for each label, the warning layer coating is applied on top of the thermal-sensitive coating.

4. The label roll of claim 2, wherein for each label, the warning layer is applied as patches of the heat-resistant capsules on top of the thermal-sensitive coating.

5. The label roll of claim 1, wherein for each label, the food safe liquid is an edible ink.

6. The label roll of claim 1, wherein for each label, the directional force is sufficient to rupture the corresponding shell membrane of the heat-resistant capsules when an attempt is made to remove each corresponding label once each label is affixed to a surface by the adhesive coating.

* * * * *

UNITED STATES PATENT AND TRADEMARK OFFICE
CERTIFICATE OF CORRECTION

PATENT NO. : 12,008,926 B2  
APPLICATION NO. : 17/374768  
DATED : June 11, 2024  
INVENTOR(S) : Shinkle, II et al.

Page 1 of 1

It is certified that error appears in the above-identified patent and that said Letters Patent is hereby corrected as shown below:

On the Title Page

Item (57), in "Abstract", in Column 2, Line 5, delete "puffing)" and insert --pulling)-- therefor Signed and Sealed this  
Twenty-sixth Day of August, 2025

Coke Morgan Stewart  
*Acting Director of the United States Patent and Trademark Office*